United States Patent
Brunheroto et al.

(10) Patent No.: US 6,643,298 B1
(45) Date of Patent: Nov. 4, 2003

(54) METHOD AND APPARATUS FOR MPEG-2 PROGRAM ID RE-MAPPING FOR MULTIPLEXING SEVERAL PROGRAMS INTO A SINGLE TRANSPORT STREAM

(75) Inventors: Jose R. Brunheroto, Hawthorne, NY (US); Frans Laemen, Ossining, NY (US); Julio Nogima, White Plains, NY (US); Frank A. Schaffa, Hartsdale, NY (US); William J. Anzick, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/447,632

(22) Filed: Nov. 23, 1999

(51) Int. Cl.[7] .................................................. H04J 3/02
(52) U.S. Cl. ........................ 370/537; 370/412; 370/392; 370/428; 370/429
(58) Field of Search ................................ 370/412, 428, 370/429, 498, 535–538, 540, 542–544, 392; 711/201–221

(56) References Cited

U.S. PATENT DOCUMENTS 5,838,873 A   11/1998   Blatter et al.
5,892,535 A * 4/1999   Allen et al. .................... 725/36
6,157,673 A * 12/2000  Cuccia ........................ 375/240
6,421,359 B1 * 7/2002   Bennett et al. ............. 370/538

FOREIGN PATENT DOCUMENTS

WO    WO 98/47284    10/1998

* cited by examiner

*Primary Examiner*—Ricky Ngo
*Assistant Examiner*—Thomas E. Volper
(74) *Attorney, Agent, or Firm*—Scully, Scott, Murphy & Presser; Douglas W. Cameron, Esq.

(57) ABSTRACT

A system and method for re-mapping the Packet Identifier (PID)'s for a set of MPEG-2 single program streams prior to multiplexing onto one multi-program transport stream. The system eliminates any ambiguity when generating the multiplexed transport stream in 10 order to avoid PID conflicts when multiplexing several single programs containing non-unique PID values. The system includes a mechanism to assign new PID values, in such a way that it ensures that all new PID's are unique for the multiplexed transport stream. Furthermore, it performs this re-mapping in real-time as the packets are being transmitted over the multi-program transport stream.

17 Claims, 4 Drawing Sheets

METHOD AND APPARATUS FOR MPEG-2 PROGRAM ID RE-MAPPING FOR MULTIPLEXING SEVERAL PROGRAMS INTO A SINGLE TRANSPORT STREAM

BACKGROUND OF THE INVENTION

1. Field of the Invention

The present invention relates to the systems and methods for multiplexing packet streams on a shared transport channel, and, more particularly, to a method for ensuring unique identification of packets associated with one or more program streams to be multiplexed on an single transport channel.

2. Discussion of the Prior Art

The MPEG-2 Generic Coding of Moving Pictures and Associated Audio: Systems Recommendation H.222.0 ISO/IEC 13818-1 defines the mechanisms for combining, or multiplexing, several types of multimedia information into one program stream. This standard uses a known method of multiplexing, called packet multiplexing. With packet multiplexing, elementary streams comprising data, video, audio, etc. are interleaved one after the other into a single MPEG-2 stream.

Transport Streams (TSs) are defined for transmission networks that may suffer from occasional transmission errors. The Packetized Elementary Streams (PESs) are further packetized into shorter TS packets of fixed length, e.g., 188 bytes. A major distinction between TS and PES is that the TS can carry several programs. Each TS packet consists of a TS Header, followed optionally by ancillary data called Adaption Field, followed typically by some or all the data from one PES packet. The TS Header consists of a sync byte (0×47), flags, indicators, Packet Identifier (PID), and other information for error detection, timing, etc. According to the MPEG-2 standard, the semantics for the TS include the following:

- Sync_byte: (8-bits) a fixed value 0×47;
- Transport_error_indicator: (1-bit) for indicating that an uncorrectable bit error exists in the current TS packet;
- Payload_unit_start_indicator: (1-bit) for indicating the presence of a new PES packet or a new TS-PSI (program specific information) Section;
- Transport_priority: (1-bit) for indicating a higher priority than other packets;
- PID: 13-bit packets Ids including values 0 and 1 which are pre-assigned, while values 2 to 15 are reserved. Values 0×0010 to 0×1FFE, may be assigned by the Program Specific Information (PSI) and value 0×1FFF is used to identify MPEG-2 Null packets;
- Transport_scrambling_control: (2-bits) for indicating the scrambling mode of the packet payload;
- Adaptation_field_control: (2-bits) for indicating the presence of an optional adaptation field prior to the payload;
- Continuity_counter: which is a counter provided per PID (e.g., 4-bits) that increments with each non-repeated TS packet having the corresponding PID.

Each MPEG-2 program stream may be characterized as a data stream (which can contain data originated from a multitude of data sources) encapsulated using MPEG-2 TS packets, with each packet containing a header field with a Packet Identifier (PID). The PID field is used by the transport demultiplexer to "tune" to a particular set of PID's that correspond to a given program stream. Each program stream must have a set of distinct PID's (except for PID=0×1FFF for the MPEG-2 Null packet).

As an example:
- Program Stream 1:<video PID=0×101, audio PID=0×102, secondary audio PID=0×107, 0×1FFF>valid
- Program Stream 2:<video PID=0×101, audio PID=0×200, private data PID=0×107, 0×1FFF>valid
- Program Stream 3:<video PID=0×102, audio PID=0×102, 0×109>invalid (audio and video programs are sharing same PID=0×102).

As an MPEG-2 transport stream multiplexes several program streams into one single transport, in order to avoid ambiguity at the receiver, it is required that all the PID's belonging to the transport stream be distinct. Thus, given a set of program streams that need to be multiplexed into a single transport stream, all the PID's must be distinct (except for the Null packet which can be present in any program stream). In the above example, the PID=0×101 is used for (video programs 1 and 2) is not allowed since it will lead to a conflict error. Therefore, in the example, one of the programs has to re-assign a new PID value to all packets containing PID=0×101 in order to remove the conflict. It is necessary to provide, in a multiplexing technique, a mechanism for eliminating the PID conflict.

One way to solve this problem is a static technique implemented at program stream creation time, which requires the encoder to ensure distinction for all the PID's for all the program to be multiplexed into a single transport stream. This requires the content provider to encode all material (e.g., movies, documentaries, sports events, news, etc.) with full knowledge of the playing sequence, to avoid PID conflict among the sources which is very restricting. Typically, this playing sequence is not known at encoding time making the static re-mapping scheme virtually infeasible.

Another possibility for eliminating the PID conflict is to search all the PID's for all the program streams that are being multiplexed. If a PID value appears in more than one program stream, then a new value is chosen that is not being used by any of the program streams. However, this process is time consuming and non-efficient because for each PID it is necessary to check all others to see if it is used by another program, the process has to be repeated for all the PID's for all the programs.

It would be highly desirable to provide a very efficient PID re-mapping mechanism for eliminating the PID conflict in the multiplexed transport stream, and moreover, one that is implementable in hardware so the PID re-mapping can be done in real-time.

SUMMARY OF THE INVENTION

It is an object of the present invention to provide a dynamic technique for distinctly assigning numbers to packets belonging to a plurality of program streams to be multiplexed on a transport channel, while avoiding searching of all the PID's for all the program streams.

It is another object of the invention to provide a real-time processing mechanism for dynamically re-mapping PIDs to eliminate the PID conflict in the multiplexed transport stream imposing no limitation on the PID assignment at the encoding time.

According to the invention there is provided a method for re-mapping packet identifier (PID) values provided in transport packets associated with different program streams to be multiplexed onto a single shared transport channel, each program stream having an associated identifier value, the method including: utilizing original PID value associated with packet to index a first table for generating an offset value; addressing a region of a second table using the offset value, the second table providing a plurality of new PID values capable of re-mapping the original PID value; utilizing the identifier value associated with the transport stream to provide an index into said region for outputting the new PID value. The new PID value is then exchanged with the original PID in the transport packet header. The PID re-mapping scheme of the invention is very efficient and straight forward to implement, using a look-up table (SRAM) and limited hardware assist (for real-time support). The PID re-mapping scheme additionally implements a mechanism for dynamically increasing or decreasing the size of a given PID re-mapping region. Furthermore, besides performing a transport stream PID re-mapping capability, the apparatus and method is also capable of modifying the MPEG-2 TS continuity_counter field—which capability is important for: 1) applications that switch between different program streams while maintaining the continuity of the continuity_count; and, 2) other content alteration schemes that require prevention of continuity content "jumps".

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
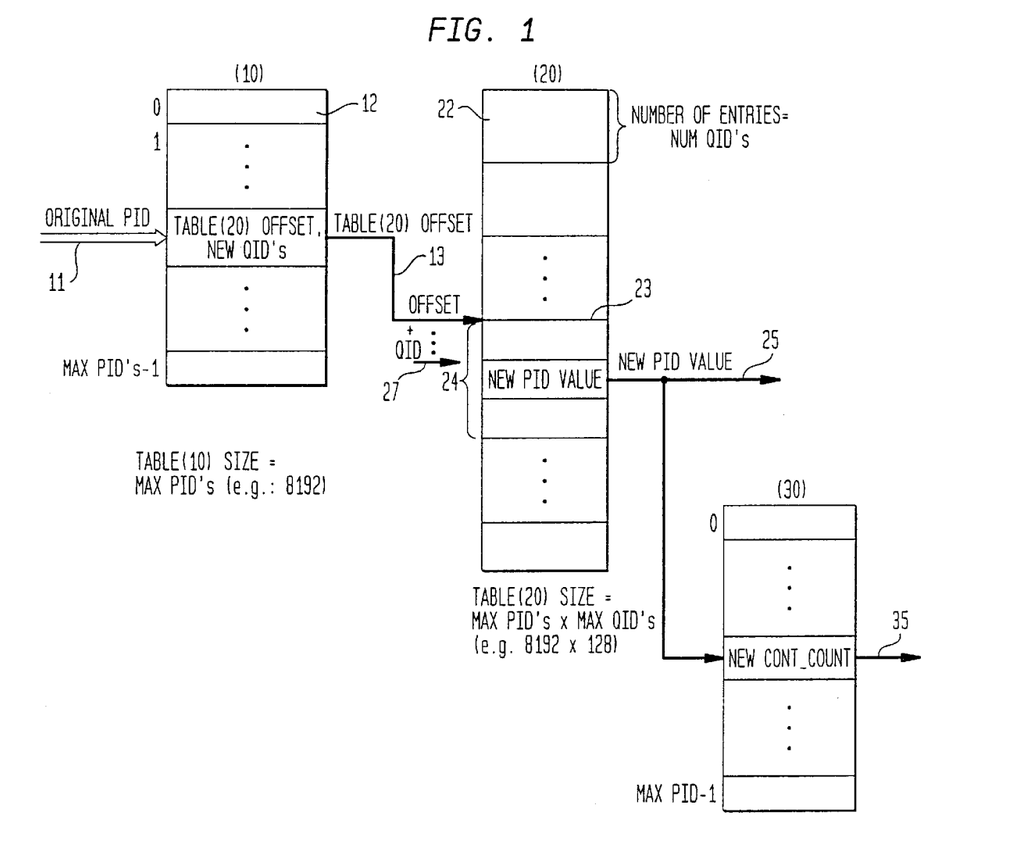
FIG. 1 is a block diagram illustrating the PID re-mapping technique using two-stage direct mapped lookup table.

According to the invention, as shown in FIG. 1, the PID re-mapping implements a two-stage table look-up scheme using look-up "swap" tables (10), (20) comprising SRAM's, for example, and an MPEG-2 PID re-mapping engine implemented using Field Programmable Gate Arrays (FPGAs), as will be described in greater detail herein. The first table (10) is provided which consists of a plurality of entries corresponding to the number of PIDs per transport stream (e.g., one entry for each PID). In case of MPEG-2 TS, PID re-mapping, given that the MPEG-2 PID field contains 13-bits, there are at most 8,192 possible PID entries in table (10) corresponding to the possible number of PID values. As shown in FIG. 1, the table (10) is implemented for only one transport stream, but it is understood that the scheme may be used for multiple transport streams by replicating the table (10) for each additional transport stream.

Figure 2A:
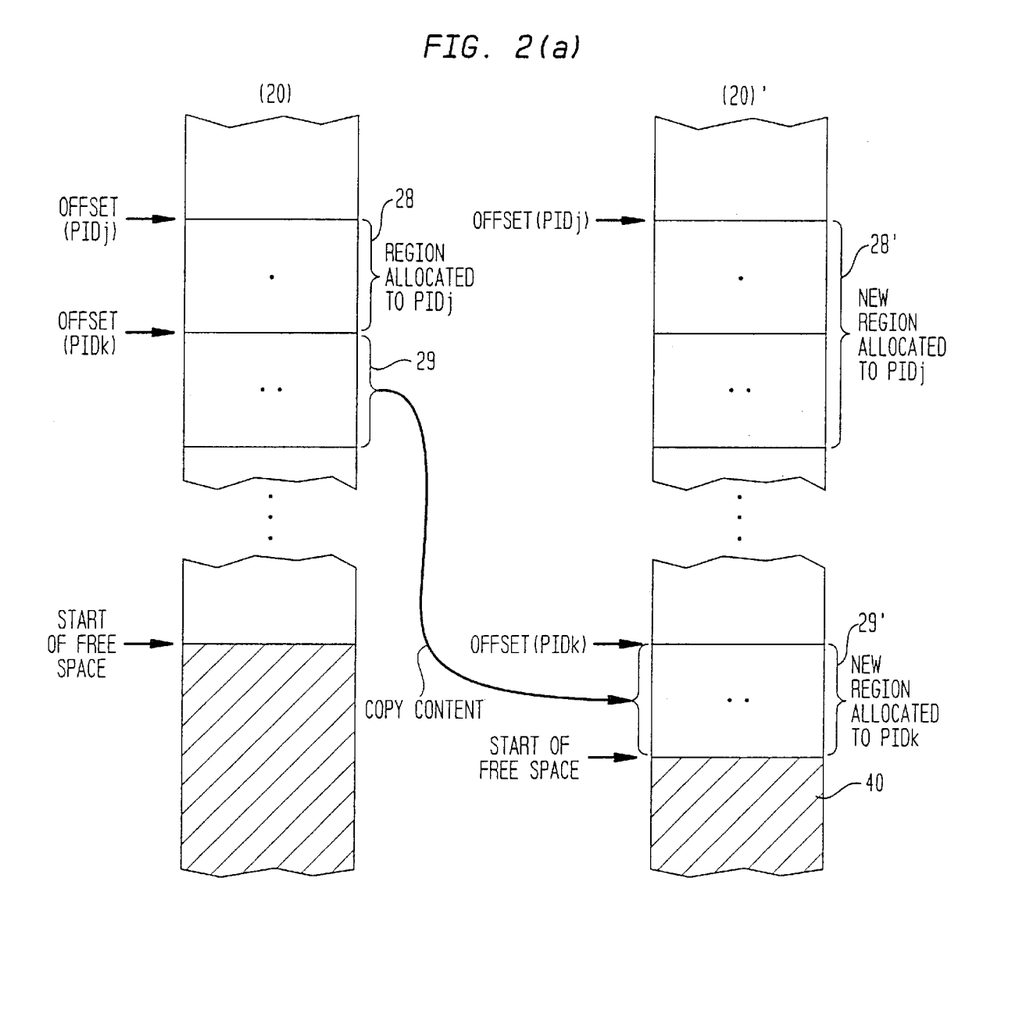
FIG. 2(a) illustrates the mechanism used to dynamically increase the size of a given PID re-mapping region.

As shown in FIG. 1, the original PID value (11) is used to address the first table (10). For each entry (12) in the first table (10), a correspondent region (22) is assigned in a second swap table (20) which provides the new PID value. The size of correspondent region 22 depends on the maximum number of programs that are multiplexed in one transport steam. Each program has an associated stream identifier referred to herein as a queue ID (QID), the function of which is shown and described in greater detail in commonly-owned, co-pending U.S. patent application Ser. No. 09/448,334 entitled METHOD AND APPARATUS FOR MULTIPLEXING A MULTITUDE OF SEPARATE DATA STREAMS INTO ONE SHARED DATA CHANNEL, WHILE MAINTAINING CBR REQUIREMENTS the whole contents and disclosure of which is incorporated by reference as if filly set forth herein. Thus, for example, if the maximum number of programs is 128, then each region (22) contains 128 entries corresponding to 128 QIDs. Note, that in one embodiment, a direct mapping is used to generate the address to the second table (20), and the number of entries per region (22) is constant, e.g., and is a power of 2. In a preferred embodiment, however, the size of a region (22) may be dynamically expanded to accommodate increased programs per transport stream or decreased to accommodate a decrease in the number of programs per transport stream. Thus for instance, the system enables the amount of new PID values to be dynamically increased for a given region (22) as new program streams are to be multiplexed onto said shared transport channel. Alternately, or in addition to, as shown in FIG. 2(a), the system dynamically reassigns new table regions in the second table 20 associated with an original PID value as new program streams are to be multiplexed onto said shared transport channel. For instance, as shown in FIG. 2(a), table (20) indicates a first region (28) of new PID values corresponding to a PID value "PIDj" pointed to by offset value PIDj. As memory space of table (20) is expandable to define corresponding table (20) time is illustrated an increased region (28') of new PID values allocated for the offset value PIDj as new program streams are provided. Likewise, table (20) indicates a first region 29 of new PID values corresponding to a PID value "PIDk" pointed to by offset value PIDk. As shown in expanded table (20'), contents of the region (29) may be copied to a new region (29') allocated for the PID value PIDk which is adjacent free memory space area (40) for further expansion as the number of QIDs per stream grow.

Figure 2B:
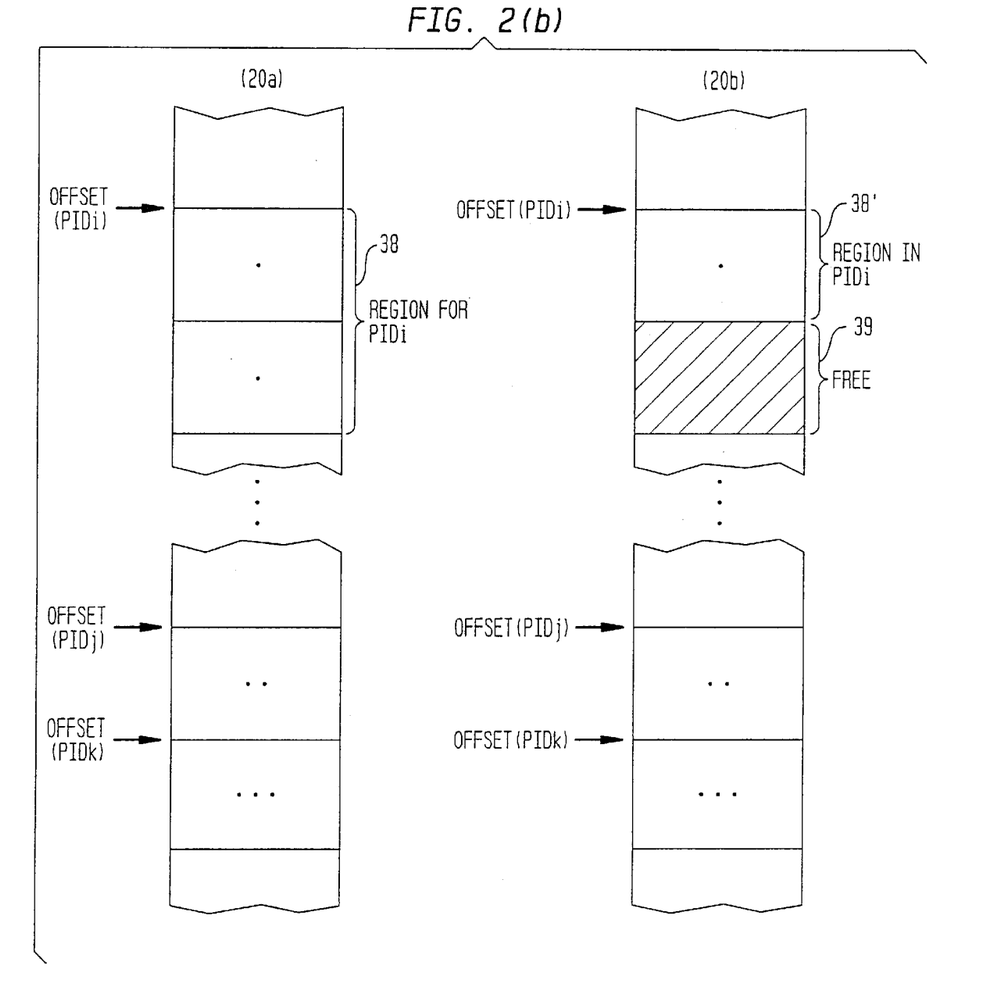
FIG. 2(b) illustrates the mechanism used to dynamically decrease the size of a given PID re-mapping region.

As mentioned, the region size (for a given PID) is determined by the largest QID number associated to it. Thus, assuming an example initial set maximum number of QID's as 32 (needs 5-bits), then if additional QID's are added in the MPEG-2 Transport Stream, eventually the maximum number of QID's reaches 33. At this moment, the region size for the PID's that belong to the (QID==33) must be doubled, as a region with 64 entries (needs 6-bits) is now required. FIG. 2(b) illustrates the mechanism used to dynamically decrease the size of a given region. Specifically, FIG. 2(b) illustrates an example second swap table (20a) indicating this new PID as PIDi having an increased corresponding region 38 of new PID values. Assuming that no more QID's are added, and the (QID==33) is subsequently removed from the MPEG-2 Transport Stream, then the region associated with PIDi needs only 32 entries. Thus, as shown in the resultant second swap table (20b), the size of increased region 38 associated with PIDi is decreased by half 38', i.e., resulting in a "free" remainder half 39 that may be used by another PID that gets assigned.

In operation, as shown in FIG. 1, each entry in table (10) per PID input is an offset value (13) that points to the start (23) of a region (24) comprising values for re-mapping a given PID. Specifically, the current QID (stream identifier) value (27) for the program associated with that transport packet to be multiplexed, is added to the offset value (13) for addressing table (20) to obtain the new PID value (25). That is, for each transport packet being multiplexed, the hardware assist indicates the correspondent program stream identifier (QID), which number is concatenated with the offset output of the first table (10) to generate the address for the second table (20). The output of the second table (20) is the new PID value that is used to replace the original PID value.

As further shown in FIG. 1, the system of the invention includes a further mechanism for generating a new continuity_count value to be swapped with the original continuity_count value contained in the header of the original transport packet to be multiplexed. Specifically, the new PID value (25) is used to address a continuity_count table (30) comprising the modified continuity_count values, for generating an appropriate continuity_count value (35) which is exchanged with the original continuity_count value of the multiplexed transport packet. The new continuity_count value (35) is stored in the packet header of the transport packet prior to multiplexing and is used to ensure continuity of the multiplexed stream, for instance, in the case where a program such as an advertisement is to be inserted (spliced) into the program stream or other alterations on the content required updates, due to changed, inserted or removed TS packets.

A further feature of the invention (not shown) is the provision of a non-real time process for parsing the transport stream's Program Specific Information "PSI" tables, extracting PID's for each program, and generating the appropriate contents for the swap tables (10) and (20). It is understood that lists must be kept of all the PID's that are being used by all the program streams for a given transport stream, the region sizes used in the second table, and the new PID values. Thus, when a program stream is added to the transport stream, each of its original PID's is checked against the list of the new PID's in use. If the PID is in use, the corresponding usage count is incremented, an offset value (13) is assigned to the PID, and a new PID is created and written to the second swap table (20). If the PID has not been used yet, the next unused offset value (region) is assigned, and a new PID is created and written to the second table (20). Furthermore, when a program stream is removed from the multiplexed transport stream, each of its original PID's is removed from the lists. The new PID's associated with this program stream are marked as unused, and the usage count is decremented. When the usage count reaches zero, both the PID and the associated region are marked as unused and, therefore, become available for subsequent use.

Figure 3:
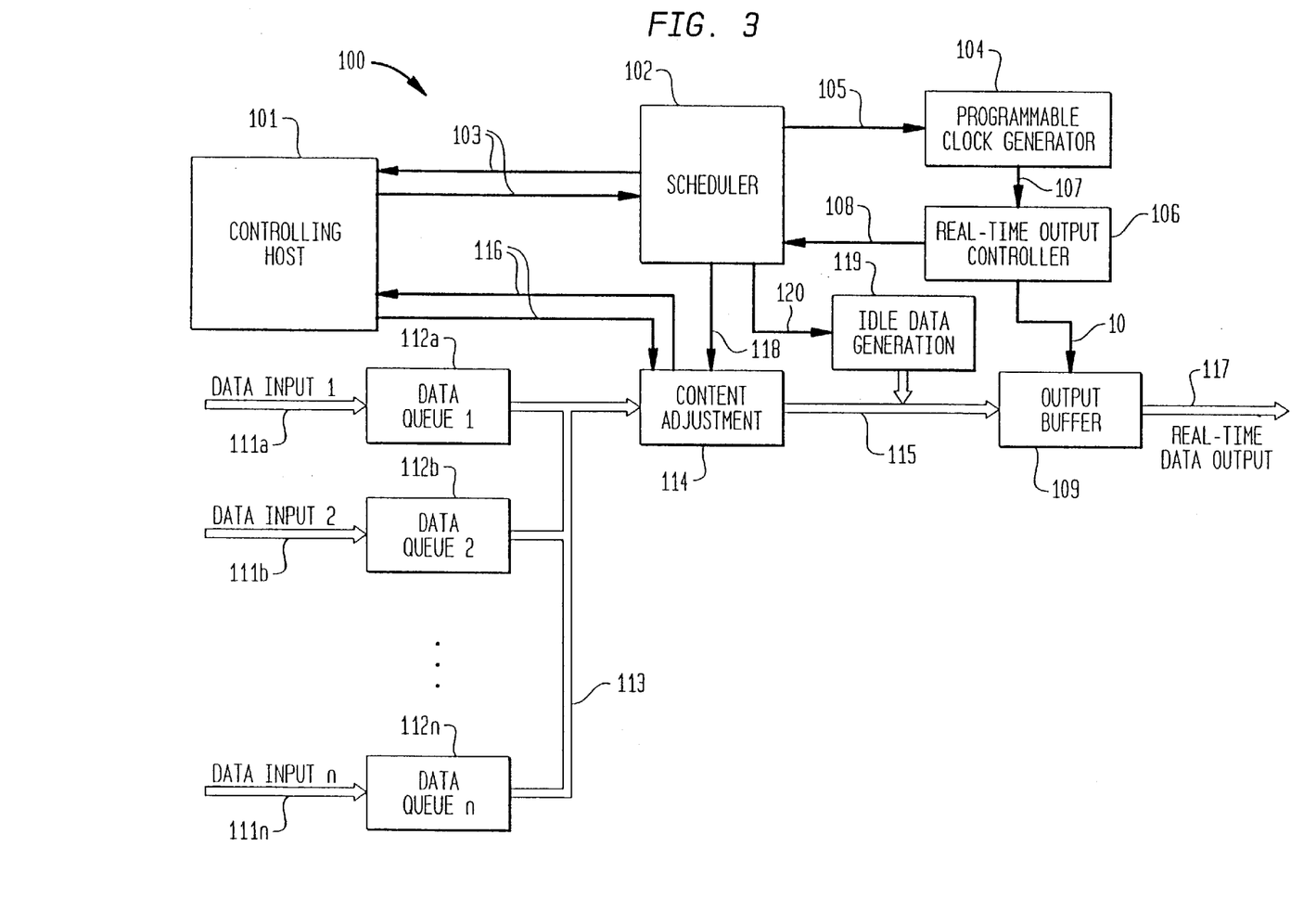
FIG. 3 is a block diagram illustrating conceptually an MPEG-2 time division multiplexing system incorporating the PID re-mapping scheme of the invention.

FIG. 3 illustrates conceptually a real-time multiplexing system (100) incorporating the PID re-mapping engine of the invention. Particularly, FIG. 3 is a functional block diagram depicting the preferred implementation of a transport stream multiplexer such as described in above-referenced, co-pending U.S. patent application Ser. No. 09/448,334. The real-time multiplexing system (100) provides multiplexed data content from a variety of sources for transmission output over a transport channel (117) having an associated channel Bit Rate (ChBR). As shown in FIG. 3, data streams from a plurality of data sources (not shown) are segmented into fixed length packets and transported from separate Data Sources (not shown) over respective Data Input connections (111a), . . . , (111n) to respective assigned Data Queues labeled (112a), . . . , (112n) provided in a packet memory (not shown). Each packet is a Fixed Packet Size (FPS), e.g., 188 bytes, in accordance with the MPEG-2 Transport Stream protocol. Further, all data sources providing a data stream are dynamically assigned a unique QID upon initialization, and, are thereafter identified thereby. As shown in FIG. 3, for each Data Input (111a), . . . , (111n) connection there is provided a corresponding dedicated bus, however, a shared data bus structure (113) may be implemented.

Although not shown in FIG. 3, hardware including a real-time DMA Controller and a small Fast Access (FIFO) Buffer large enough to hold at least one transport packet are connected to the Shared Data Bus (113). In operation, upon request from a Scheduler device (102) via control lines to the DMA controller and fast access (FIFO) buffer (not shown), transfer of a transport packet from a Data Queue (112) is initiated by the scheduled QID to the FIFO Buffer via a bus (113). Note that the only functionality of the DMA controller and FIFO Buffer is to ensure real-time access to the next scheduled packet. As further shown in FIG. 3, there is provided a data path to a second buffer referred to as the Output Buffer (109), which, preferably, is large enough to hold several transport packets for multiplexed output thereof over real-time transport channel (117).

FIG. 3 further illustrates the Real-Time Output Controller (106) which provides a signal (110) to enable the Output Buffer (109) to transmit the appropriate amount of data in the appropriate time, depending upon the physical layer characteristics of the single transport channel. Particularly, the Real-Time Output Controller (106) operates under timing derived from a Clock Signal (107) received from the Programmable Clock Generator (104) which is preset by the Scheduler (102) via signal line (105). As shown in FIG. 3, the scheduler (102) receives the ChBR information upon channel initialization from a controlling host (101) through a host interface (103).

In the preferred embodiment, data content from data queues (112) is provided to the Output Buffer (109) from the Fast Access Buffer via the intermediary of a content adjuster block (114) which implements changes to the Transport Packets as required by the TDM. It is in the content adjuster block (114) that the PID re-mapping scheme of the invention, is provided. As mentioned, after completion of the transfer of packet from the appropriate Data Queue (112) into the FIFO Buffer upon request from the Scheduler (102), the PID real-time engine in the Content Adjustment block (114) reads, adjusts and moves the total packet from the FIFO Buffer to the Output Buffer (109). The Real-Time Output Controller (106) informs the scheduler (102) of the completion of the transmission of every Transport Packet which enables the Scheduler (102) to remain synchronized with the ChBR and keep accurate timing information via signal line (108).

According to the preferred embodiment, as shown in FIG. 3, the content adjuster block includes an MPEG-2 transport stream (TS) PID re-mapping engine having the characteristics and capabilities described herein including: 1) capability of performing on-the-fly PID re-mapping for a given set of program streams multiplexed into one transport stream. Note: the maximum number of program streams per transport stream defines the swap table SRAM size; and 2) capability of re-establishing the continuity (of TS header continuity_count) when switching from one program stream to another (e.g., movie→advertisement→movie). Preferably, the task of computing new offsets and new PID for the tables (10) and (20) is done prior to inserting the program stream into the transport stream, and requires minimum support from the host processor (101). Particularly, hardware is provided to actually fetch the PID, and read both tables (10), (20) to get the new PID value and replace the old PID with the new PID in the TS packet. Further capabilities include: capability of detecting non-assigned PID's for a given program stream, and replacing them with MPEG-2 Null packets, thus, avoiding undesired data to be transmitted. For example, filtering out packets based on the contents of PSI table; capability of removing a given packet from a program stream, and replacing it with an MPEG-2 Null packet which is useful if bandwidth has to be reserved to transmit data embedded in the program stream; capability of detecting TS continuity_count jumps, indicating possible packet loss, and signaling it to the host processor; and, capability of reporting packets that contain an adaptation field (e.g., PCR).

In an example implementation, the real-time MPEG-2 PID re-mapping engine of the invention supports up to 128 program streams per transport stream, and furthermore, it supports up to two multiplexed transport program streams ports. Access to the two-stage look-up table can be done by the host processor (capable of altering its contents) (101) and by the re-mapping engine (read only). A synchronization mechanism is used that gives priority to the real-time engine.

The Fast Access Buffer (FIFO) used to interface the real-time engine provided in the content adjuster (114) with the packet memory, receives data from the packet memory a packet at a time. The real-time engine initially reads the packet header (PID) and starts the process of PID re-mapping, with the new PID value replacing the original PID value. The remainder of the packet is then transmitted to the output buffer (109). Note: when programing the DMA controller engine to transfer one packet from the Packet memory to the Fast Access Buffer (FIFO), the host processor also programs the real-time engine, indicating which program stream (QID) is associated to this packet. This real-time PID re-mapping engine additionally checks if a packet belonging to a given program stream contains a PID that is not present in the look-up table. In such a scenario, the real-time engine replaces the packet (header+payload) with an MPEG-2 Null packet, and optionally signals the host processor (101) indicating an error condition. Furthermore, the engine is capable of removing a given packet and replacing it with an MPEG-2 Null packet (as directed by the Host Processor). This operation is useful if the multiplexer is reserving bandwidth for in-band data transmission using the program stream. Additionally, the real-time engine may report the presence of packets that includes an adaptation field which is useful to help identify packets that carry the Program Clock Reference (PCR) information.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for re-mapping packet identifier (PID) values provided in transport packets associated with different program steams to be multiplexed onto a single shared transport channel, each program steam having an associated identifier value, said method including:
   utilizing original PID value provided in a transport packet header associated with a packet to index a first table for generating an offset value;
   addressing a region of a second table using said offset value, said second table providing a plurality of new PID values capable of being mapped to said original PID value;
   utilizing said identifier value associated with said program stream to provide an index into said region to provide said new PID value, wherein said new PID value is exchanged with said original PID in said transport packet.

2. The method as claimed in claim 1, wherein said packet header includes continuity_count value for ensuring continuous stream of packets for multiplexing, said method further comprising the step of regenerating a continuity_count value based on said new PID value to ensure continuity of said transport stream for that program.

3. The method as claimed in claim 2, wherein said regenerating step further includes the step of utilizing said new PID value to address a third table for generating continuity_count values.

4. The method as claimed in claim 1, wherein each said region associated with an original PID includes a predetermined amount of new PID values.

5. The method as claimed in claim 4, further including the step of dynamically increasing an amount of new PID values for a given region as new program streams are to be multiplexed onto said shared transport channel.

6. The method as claimed in claim 4, further including the step of reassigning new table regions in said second table associated with an original PID value as new program streams are to be multiplexed onto said shared transport channel.

7. The method as claimed in claim 4, further including the step of dynamically decreasing an amount of new PID values for a given region as a program stream is removed from said shared transport channel.

8. A system for re-mapping packet identifier (PID) values provided in transport packets associated with different program streams to be multiplexed onto a single shared transport channel, each program stream having an associated identifier value, said system including:
   means for indexing a first look-up table for generating an offset value relating to an original PID value provided in a transport packet header associated with the packet to be multiplexed;
   means implementing said offset value for identifying a start address in a second look-up table including a region having a plurality of new PID values capable of being mapped to said original PID value;
   means utilizing said identifier value associated with the transport stream of said packet as an index into said region to generate a new PID value; and,
   means for exchanging said new PID value with said original PID value included in said transport packet.

9. The system as claimed in claim 8, wherein said packet header includes continuity_count value for ensuring continuous stream of packets for multiplexing, said system further including means for regenerating a continuity_count value based on said new PID value to ensure continuity of said transport stream for that program.

10. The system as claimed in claim 9, wherein said regenerating means includes means utilizing said new PID value for addressing a third table for generating a continuity_count value.

11. The system as claimed in claim 8, wherein each said region associated with an original PID includes a predetermined amount of new PID values.

12. The system as claimed in claim 8, further including means for dynamically increasing an amount of new PID values for a given region as new program streams are to be multiplexed onto said shared transport channel.

13. The system as claimed in claim 8, further including means for reassigning new table regions in said second table associated with an original PID value as new program streams are to be multiplexed onto said shared transport channel.

14. The system as claimed in claim 8, further including means for dynamically decreasing an amount of new PID values for a given region as a program stream is removed from said shared transport channel.

15. In a system for multiplexing transport packets associated with one or more data sources for transmission over a shared fixed bit rate medium wherein the multiplexing system includes: a data queue memory storage device associated with a respective data source for storing transport packets associated with said data source, each data queue memory device having an associated queue identifier (QID) and each transport packet having a header including an associated original packet identifier (PID); an output buffer for multiplexing said packet onto said shared fixed bit rate medium; and, a data bus connecting said data queue memory storage device with said output buffer; a real-time PID re-mapping system comprising:

buffer means for receiving said transport packet from a data queue memory device from said data bus;

a first look-up table for generating an offset value relating to the original PID value associated with the packet to be multiplexed;

a second look-up table including a region having a plurality of new PID values capable of being mapped to said original PID value;

means utilizing said QID as an index into said region to generate a new PID value at an output of said second table; and, means for exchanging said new PID value with said original PID value included in said transport packet header.

16. The system for multiplexing transport packets as claimed in claim 15, wherein said packet header includes continuity_count value for ensuring a continuous stream of packets for multiplexing, said system further including means for regenerating a continuity_count value based on said new PID value to ensure continuity of a transport stream for that data source.

17. The system for multiplexing transport packets as claimed in claim 16, wherein said regenerating means includes means utilizing said new PID value for addressing a third table for generating a continuity_count value.

* * * * *

UNITED STATES PATENT AND TRADEMARK OFFICE
CERTIFICATE OF CORRECTION

PATENT NO. : 6,643,298 B1 Page 1 of 1
APPLICATION NO. : 09/447632
DATED : November 4, 2003
INVENTOR(S) : Jose R. Brunheroto et al.

It is certified that error appears in the above-identified patent and that said Letters Patent is hereby corrected as shown below:

Column 3, Line 10:
"header. The" should read -- header. ¶ The --

Column 4, Line 8:
"filly" should read -- fully --

Column 4, Line 11:
"embodient" should read -- embodiment --

Column 4, line 30:
"time" should read -- there --

Column 8, Line 33, Claim 8:
" the packet" should read -- a transport packet --

Column 8, Line 40, Claim 8:
"the transport stream" should read -- the program stream --

Column 8, Line 45, Claim 9:
"ensuring continuous stream" should read -- ensuring a continuous stream --

Column 8, Line 49, Claim 9:
"said transport stream for that program"

should read

-- said program stream --

Signed and Sealed this

Twenty-fifth Day of July, 2006

JON W. DUDAS
*Director of the United States Patent and Trademark Office*